United States Patent
Sachs et al.

(10) Patent No.: US 8,453,946 B2
(45) Date of Patent: Jun. 4, 2013

(54) FRONT STRUCTURE FOR A MOTOR VEHICLE

(75) Inventors: Martin Leonhard Sachs, Roedermark (DE); Theobald Hock, Grossostheim (DE); Rolf Ewert, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/214,320

(22) Filed: Aug. 22, 2011

(65) Prior Publication Data

US 2012/0043771 A1    Feb. 23, 2012

(30) Foreign Application Priority Data

Aug. 20, 2010    (DE) .......................... 10 2010 034 928

(51) Int. Cl.
  *B60R 19/24*    (2006.01)
  *B62D 25/16*    (2006.01)

(52) U.S. Cl.
  USPC ............................. 239/154; 293/141; 29/198

(58) Field of Classification Search
  USPC ........................... 293/154, 155, 141; 296/198
  See application file for complete search history.

(56) References Cited

U.S. PATENT DOCUMENTS

| | | | |
|---|---|---|---|
| 4,895,406 A * | 1/1990 | Goesse et al. | 293/102 |
| 6,135,517 A | 10/2000 | Cordebar | |
| 6,592,164 B2 * | 7/2003 | Nagae et al. | 296/29 |
| 6,598,924 B2 * | 7/2003 | Palmer et al. | 296/29 |
| 8,226,133 B2 * | 7/2012 | Sano | 293/155 |
| 2003/0015882 A1 | 1/2003 | Nagae | |

FOREIGN PATENT DOCUMENTS

| | | |
|---|---|---|
| DE | 4432766 A1 | 7/1996 |
| DE | 10147621 A1 | 4/2003 |
| DE | 69902324 T2 | 12/2003 |
| DE | 10228464 A1 | 1/2004 |
| DE | 19736755 B4 | 3/2006 |
| EP | 2127955 A1 | 12/2009 |
| JP | 2002-220008 * | 8/2002 |

OTHER PUBLICATIONS

German Patent Office, German Search Report for Application No. 102010034928.3, dated Apr. 6, 2011.
UK IPO, British Search Report for Application No. 1110998.0, dated Oct. 20, 2011.

* cited by examiner

*Primary Examiner* — Dennis Pedder
(74) *Attorney, Agent, or Firm* — Ingrassia Fisher & Lorenz, P.C.

(57) ABSTRACT

With a front structure for a motor vehicle, a holding mechanism for connecting a bumper to a fender includes a fastening strip and a guide rail. The fastening strip spring-elastically supports itself on the fender and is screwed to the guide rail. The bumper is latched to the guide rail.

11 Claims, 2 Drawing Sheets

FRONT STRUCTURE FOR A MOTOR VEHICLE

CROSS-REFERENCE TO RELATED APPLICATION

This application claims priority to German Patent Application No. 102010034928.3, filed Aug. 20, 2010, which is incorporated herein by reference in its entirety.

TECHNICAL FIELD

The technical field relates to a front structure for a motor vehicle with a bumper facing in driving direction, with a fender adjoining the bumper and with holding means for holding the bumper on the fender.

BACKGROUND

A front structure is known, for example, from DE 44 32 766 A1. With this front structure the holding means have a clamping body which interconnects flanges of the fender and of the bumper positioned opposite each other. The bumper additionally has an engagement hook for engaging behind a web of the clamping body.

Disadvantageous with this front structure is that an accurate alignment of the bumper relative to the fender cannot be permanently ensured. For example, the position of the clamping body during the assembly can change relative to the fender so that the position of the bumper relative to the fender changes automatically. This change of the position of the bumper relative to the fender results in an irritating appearance of the front structure.

At least one object relates to developing a front structure of the type mentioned at the outset so that it makes possible a reliable fixing of the position of the bumper relative to the fender. In addition, other objects, desirable features and characteristics will become apparent from the subsequent summary and detailed description, and the appended claims, taken in conjunction with the accompanying drawings and this background.

SUMMARY

A holding apparatus has a guide rail connected with a fastening strip, in that the fastening strip is held on the fender and the guide rail has a collar, so that the collar is positioned opposite an angled-off portion of the fender and in that an edge of the bumper is arranged between angled-off portion and collar. Through this configuration the bumper is supported by the guide rail and thus the fender via the fastening strip. Thus it is ensured that the bumper permanently withstands the operating forces of the motor vehicle. A change of the position of the bumper relative to the fender is thus reliably prevented. As a result of this, an even joint course between the bumper and the fender can be ensured.

The assembly of the front structure according to an embodiment proves particularly simple if the fastening strip is spring-elastically supported on the fender. Thus, the fastening strip during the assembly is spring-elastically held in its position. Furthermore, the spring-elastic support ensures that the fastening strip is reliably aligned relative to the fender. Because of the connection of the bumper to the fastening strip the bumper is thus also aligned relative to the fender.

According to another embodiment it is a contribution to further increase the strength of the connection of the fender is if the fastening strip is screwed or clamped to the fender.

According to another embodiment the fastening strip during the assembly is reliably fixed relative to the fender if a spring element stands away from the fastening strip and with a hook-shaped end enters a recess of the fender.

The assembly of the bumper according to another embodiment proves to be particularly easy if the bumper has an engagement hook and if the engagement hook is latched between the guide rail and the fender. Holding the bumper proves to be particularly simple in design according to another embodiment if the guide rail has an engagement element for holding the engagement hook of the bumper. Direct screwing of the fastening strip to the fender can be simply avoided according to another advantageous further development of the invention if a part region of the fender is clamped between the fastening strip and the guide rail.

The connection of the fastening strip to the guide rail and the clamping of the part region of the fender prove to be particularly easy according to another advantageous further development of the invention if the fastening strip is screwed, latched or riveted to the guide rail or fastened in any other suitable manner. There, the clamped-in part region of the fender is arranged between the fastening strip and the guide rail.

According to another embodiment it is a contribution to the further increase of the stability of the support of the bumper if the fender has a support flange run behind the bumper and if the guide rail abuts the support flange.

The guide rail according to another embodiment has a particularly stable multiple support if the guide rail is screwed, latched or riveted to the support flange or fastened in any other suitable manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
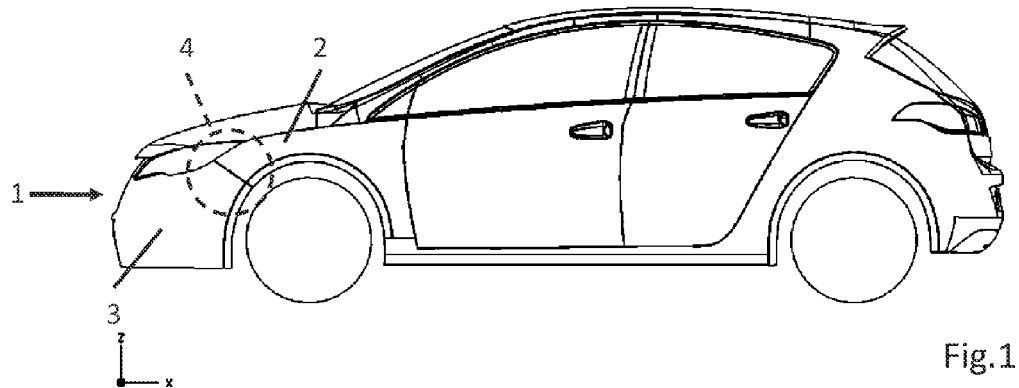
FIG. 1 is a motor vehicle with a front structure.

FIG. 1 shows a motor vehicle with a front structure 1. The front structure 1 has a fender 2 and a bumper 3 delimiting the front structure 1 in driving direction. The bumper 3 is connected to the fender 2 via holding means 4. In FIG. 1 the holding means 4 are concealed by the fender 2 and the bumper 3.

Figure 2:
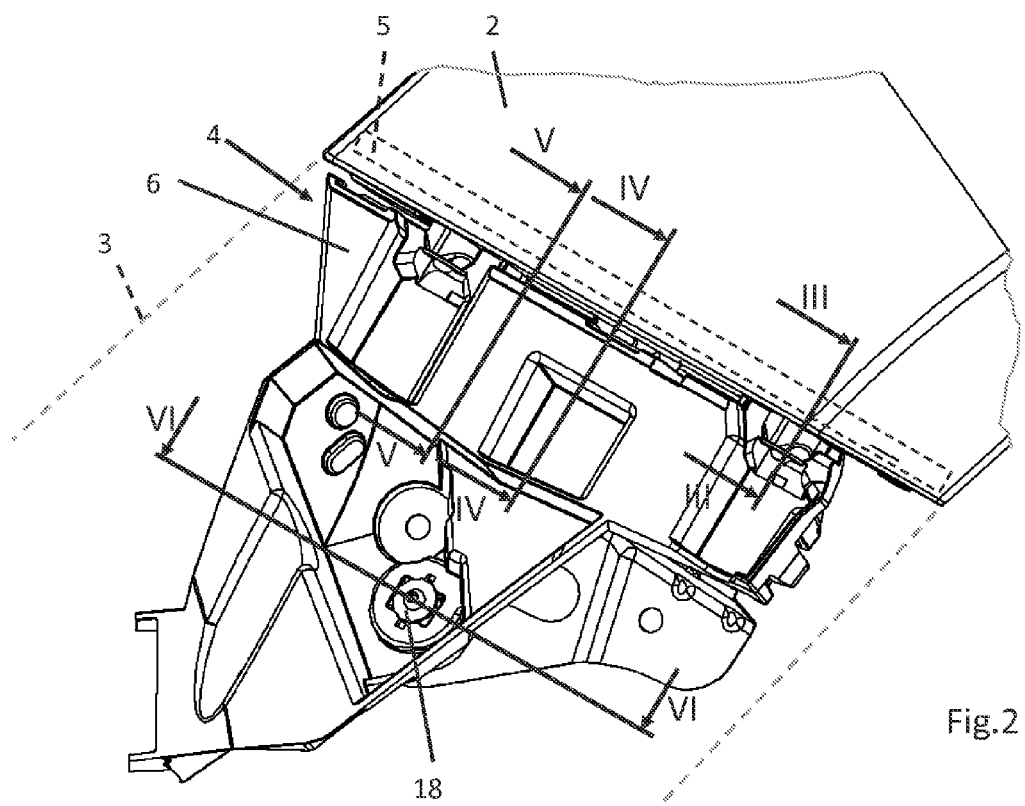
FIG. 2 is enlarged a part region of the front structure from FIG. 1.

FIG. 2 shows a part region of the front structure 1 from FIG. 1 with the bumper 3 and the holding means 4. To simplify the drawing, the outline of the bumper 3 is represented with a dash hyphen dotted line. The holding means 4 comprise a fastening strip 5 fastened to the fender 2 and a guide rail 6 connected to the fastening strip 5. The guide rail 6 is arranged below the bumper 3, while the fastening strip 5 is FIG. 2 is concealed by the fender 2 for the greatest part.

Figure 3:
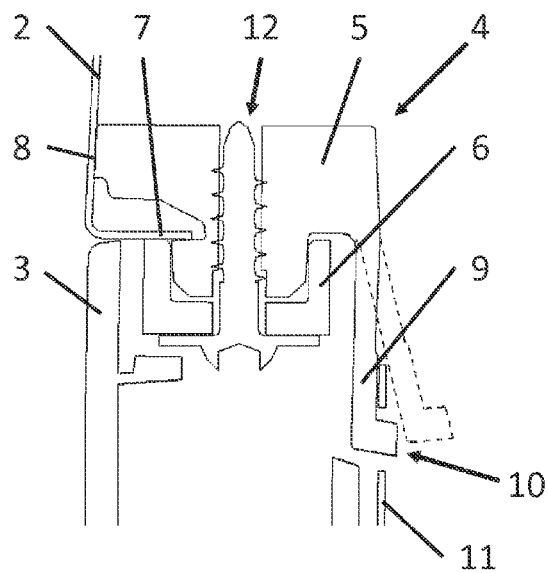
FIG. 3 is a sectional representation through the part region of the front structure from FIG. 2 along the line III-III.

FIG. 3 shows an enlarged sectional representation through the holding means 4 from FIG. 2 along the line III-III. Here it is evident that the fastening strip 5 abuts an angled-off portion 7 of the fender 2 and is spring-elastically preloaded against an outer skin 8 of the fender 2. For this spring-elastic preload the fastening strip 5 has a hook-shaped spring element 9 which with its end enters a recess 10 of the fender 2. The spring element 9 is produced unitarily with the fastening strip 5. For explanation purposes, this spring element 9 is shown in the drawing in interrupted line in the untensioned state. The guide rail 6 has a screw connection 12 with the fastening strip 5. The angled-off portion 7 of the fender 2 is clamped between the guide rail 6 and the fastening strip 5 through the screw connection. Furthermore, FIG. 3 shows a part region of the bumper 3 adjoining the outer skin 8 of the fender 2.

Figure 4:
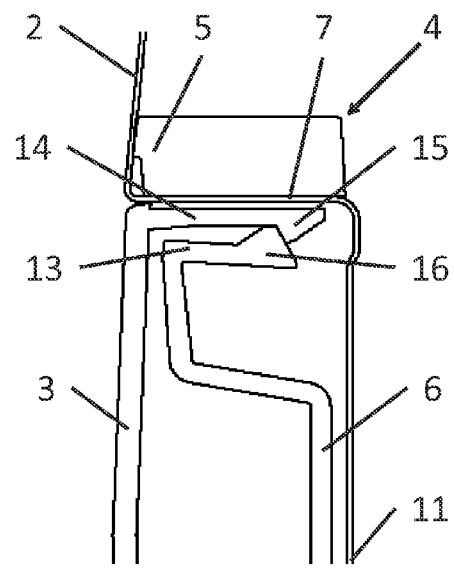
FIG. 4 is a sectional representation through the part region of the front structure from FIG. 2 along the line IV-IV.

FIG. 4 shows a sectional representation through the connection of the bumper 3 to the fender 2 along the line IV-IV from FIG. 2. Here it is evident that the guide rail 6 has a collar 13 positioned opposite the angled-off portion 7. Between the collar 13 and the angled-off portion 7 an edge 14 of the bumper 3 enters. The edge 14 of the bumper 3 has an engagement hook 15, which engages behind an engagement element 16 of the guide rail 6. Furthermore, FIG. 4 shows that the guide rail 6 supports itself on the support flange 11 of the fender 2.

Figure 5:
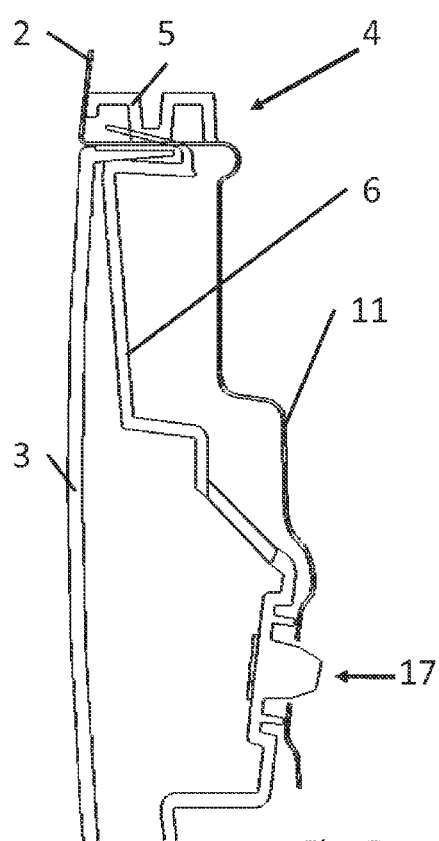
FIG. 5 is a sectional representation through the part region of the front structure from FIG. 2 along the line V-V.

FIG. 5 shows a further sectional representation through the connection of the bumper 3 to the fender 2 from FIG. 2 along the line V-V. Here it is evident that the guide rail 6 has a holding element 17 entering the support flange 11.

Figure 6:
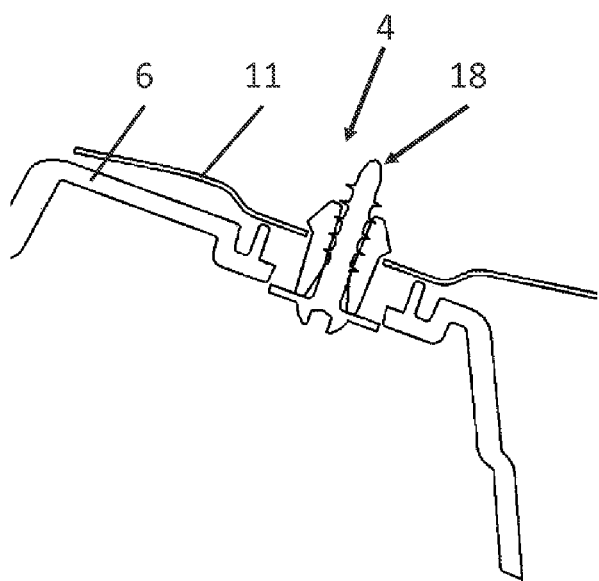
FIG. 6 is a sectional representation through the part region of the front structure from FIG. 2 along the line VI-VI.

FIG. 6 shows a sectional representation through a part region of the holding means 4 from FIG. 2 along the line VI-VI. The support flange 11 of the fender 2 comprises a further screw connection 18 to the guide rail 6.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front structure for a motor vehicle, comprising:
    a bumper facing in a driving direction;
    a fender adjoining the bumper and including an outer skin;
    a holding mechanism configured to hold the bumper on the fender, the holding mechanism comprising:
        a fastening strip spring-elastically preloaded against the outer skin of the fender;
        a guide rail connected to the fastening strip in that the fastening strip is held on the fender and the guide rail comprises a collar, in that the collar is positioned opposite an angle-off portion of the fender and in that an edge of the bumper is arranged between angled-off portion and the collar.

2. The front structure according to claim 1, wherein the fastening strip is connected to the fender through a screw connection.

3. The front structure according to claim 1, wherein the fastening strip is clamped to the fender.

4. The front structure according to claim 1, wherein the spring-elastically preloaded fastening strip includes a spring element standing away from the fastening strip and with a hook-shaped end enters a recess of the fender.

5. The front structure according to claim 2, wherein the bumper comprises an engagement hook and in that the engagement hook is latched between the guide rail and the fender.

6. The front structure according to claim 5, wherein the guide rail comprises an engagement element configured to hold the engagement hook of the bumper.

7. The front structure according to claim 2, wherein a part region of the fender is clamped in between the fastening strip and the guide rail.

8. The front structure according to claim 2, wherein the fastening strip is fastened to the guide rail.

9. The front structure according to claim 2, wherein the fender comprises a support flange run behind the bumper and the guide rail abuts the support flange.

10. The front structure according to claim 9, wherein the guide rail is fastened to the support flange.

11. The front structure according to claim 1, wherein the fastening strip is disposed on the fender along substantially an entire interface between the fender and the bumper.

* * * * *